US010900532B2

(12) United States Patent
Macchietto et al.

(10) Patent No.: US 10,900,532 B2
(45) Date of Patent: Jan. 26, 2021

(54) METHOD AND APPARATUS OF PROVIDING ENERGY ABSORPTION FOR VIBRATION DAMPENING IN A HORIZONTAL PLANE

(71) Applicant: Valmont Industries, Inc., Omaha, NE (US)

(72) Inventors: Carl J. Macchietto, Omaha, NE (US); Richard E. Christenson, Mansfield Center, CT (US)

(73) Assignee: Valmont Industries, Inc., Omaha, NE (US)

(*) Notice: Subject to any disclaimer, the term of this patent is extended or adjusted under 35 U.S.C. 154(b) by 0 days.

(21) Appl. No.: 16/190,280

(22) Filed: Nov. 14, 2018

(65) Prior Publication Data

US 2019/0154099 A1    May 23, 2019

Related U.S. Application Data

(60) Provisional application No. 62/589,335, filed on Nov. 21, 2017.

(51) Int. Cl.
*F16F 9/30* (2006.01)
*F16F 7/10* (2006.01)
(Continued)

(52) U.S. Cl.
CPC ............ *F16F 7/1022* (2013.01); *E02D 31/08* (2013.01); *F16F 7/015* (2013.01); *F16F 2222/08* (2013.01);
(Continued)

(58) Field of Classification Search
CPC .. F16F 7/10; F16F 7/015; F16F 15/363; F16F 15/366; F16F 9/30; E02D 31/08; F16C 27/04
(Continued)

(56) References Cited

U.S. PATENT DOCUMENTS 4,713,917 A    12/1987    Buckle et al.
6,237,302 B1    5/2001    Robert
(Continued)

FOREIGN PATENT DOCUMENTS

CN        10123227 A        8/2007
CN        103557266    *    2/2014    ............ F15F 15/02
(Continued)

OTHER PUBLICATIONS

International Application PCT/US2018/060881, International Search Report and Written Opinion dated Jan. 23, 2019, 12 pages.

*Primary Examiner* — Christopher P Schwartz
(74) *Attorney, Agent, or Firm* — Milligan PC LLO (57) ABSTRACT

The present invention provides a method and apparatus for energy absorption and vibrational dampening in a horizontal plane. According to a first preferred embodiment, the present invention discloses an apparatus for damping vibration of a pole which includes a housing with a horizontal floor having an inward curved surface for achieving vibration attenuation at a middle portion thereof to form an enclosed chamber. According to a further aspect of the first embodiment, at least one damping weight is preferably disposed in the inward curved surface and is preferably substantially spherical in shape. According to a further preferred embodiment, at least one dampening weight of the present may preferably include a hollow, inner cavity. According to further aspects of the present invention, the dampening weight preferably may further include a granular material located within the inner cavity.

12 Claims, 7 Drawing Sheets

(51) Int. Cl.
*F16F 7/01* (2006.01)
*E02D 31/08* (2006.01)

(52) U.S. Cl.
CPC ... *F16F 2224/02* (2013.01); *F16F 2224/0208* (2013.01); *F16F 2234/08* (2013.01)

(58) Field of Classification Search
USPC .................................................. 188/268, 378
See application file for complete search history.

(56) References Cited

U.S. PATENT DOCUMENTS

| | | | |
|---|---|---|---|
| 6,321,492 | B1 | 11/2001 | Robinson |
| 6,802,405 | B2 * | 10/2004 | Barcock ............. F16F 7/015 |
| | | | 188/268 |
| 8,991,574 | B2 | 3/2015 | Provost et al. |
| 9,121,466 | B2 * | 9/2015 | Tsugihashi ............ F16F 15/363 |
| 9,500,257 | B2 * | 11/2016 | Kanaya ................. F16F 13/10 |
| 9,593,828 | B2 | 3/2017 | Macchietto et al. |
| 2002/0030315 | A1 * | 3/2002 | Kato .................... F16F 7/10 |
| | | | 267/141 |
| 2007/0012530 | A1 * | 1/2007 | Garcia ................. F16C 27/04 |
| | | | 188/268 |
| 2012/0024646 | A1 | 2/2012 | Tsugihashi et al. |
| 2015/0323033 | A1 * | 11/2015 | Macchietto ............. F16F 7/10 |
| | | | 188/378 |

FOREIGN PATENT DOCUMENTS

| | | |
|---|---|---|
| GB | 1280301 A | 7/1972 |
| GB | 1293391 A | 10/1972 |
| GB | 1303990 A | 1/1973 |
| JP | 2000046103 A | 2/2000 |
| JP | 2000046106 A | 2/2000 |
| JP | 2001219848 A | 8/2001 |
| WO | 9001645 A1 | 2/1990 |

* cited by examiner

METHOD AND APPARATUS OF PROVIDING ENERGY ABSORPTION FOR VIBRATION DAMPENING IN A HORIZONTAL PLANE

RELATED APPLICATIONS

The present application claims priority to U.S. Provisional Application No. 62/589,335 filed Nov. 21, 2017.

FIELD OF INVENTION

The present invention is related in general to vibration dampening and, in particular, to a method and apparatus of providing energy absorption for vibration dampening in a horizontal plane.

BACKGROUND OF THE INVENTION

Road and wind vibrations are a significant impediment to a variety of vertical structures such as light poles. These vibrations are particularly problematic when the structure is lightly damped and road or wind excitations is near the natural frequencies of the structure. When this problem occurs, the energy of large excitations can cause fatigue failures of the structures.

A number of different solutions have been applied to reduce vibrations of poles. Prior art, in particular U.S. Pat. No. 7,871,186 B2, has used weights, solid ball(s), to impact the walls of a damper chamber to provide energy dissipation. The energy dissipation in this prior art has been limited to impact. More recently, U.S. Pat. No. 9,593,828 discloses a sealed bowl which dissipates energy as a mass damper approach, with a mass element, stiffness tuned at a particular frequency and damping of the moving mass achieved in some specific manner. The mass has been realized by a ball or a weight resting on balls. The stiffness is achieved by translating the mass on a curved surface, curved specifically to produce the desired frequency and effective stiffness. The damping is achieved by either an eddy current damper, friction between multiple solid balls, or impact against the walls of the damper. Other similar solutions, not applied to pole structures with translational vibration however, include filling a chamber with granular material to dissipate energy by either the granular material impacting the wall, friction against the other granular material as it moves about, or a paddle/element moving through the granular material. US Publication No. 20120024646A1 discloses a seismic control structure for a building which acts as a dampening structure in this manner. Still further, WO1990001645A1 discloses a vibration dampening material which uses viscoelastic spheres to fill restricted areas such as structural boxes, walls and around pipes in this manner.

While each of the prior art solutions may be effective in selected circumstances, there remains an important need to provide further effective dampening for light poles and similar structures which are repeatedly subject to vibrations in a simple, robust and practical manner.

Based on the foregoing, there is a need for a method and apparatus for providing effective dampening of various modes of vibrations for a range of different types of poles. The present invention is different than other dampers using granular material as the granular material is placed inside a ball that translates in a damper housing. In prior realizations the granular material is placed directly into the chamber. Further, the prior art does not place granular material to provide damping as part of a tuned mass damper. The present invention damper is also different than U.S. Pat. No. 9,593,828 as the ball in the present invention serves two purposes, both mass and damping. In accordance with aspects of the present invention, the translating mass is both the shell of the ball and the granular material inside of the ball. Accordingly, the damping is achieved through friction and impact as the granular material tumbles within the ball.

SUMMARY OF THE DISCLOSURE

To minimize the limitations found in the prior art, and to minimize other limitations that will be apparent upon the reading of the specifications, aspects of the present invention preferably include a spherical ball filled partially with granular material which preferably translates on a curved surface to dissipate energy as a tuned mass damper on a vertical structure. In this configuration, the curved surface of the present invention preferably provides an effective stiffness or restoring force that enacts the frequency tuning of the tuned mass damper.

According to a first preferred embodiment, the present invention discloses an apparatus for damping vibration of a pole. The apparatus preferably includes a housing with a horizontal floor having an inward curved surface for achieving vibration attenuation at a middle portion thereof to form an enclosed chamber. According to a further aspect of the first embodiment, at least one damping weight is preferably disposed in the inward curved surface and is preferably substantially spherical in shape. Preferably, the damping weights are disposed for free movement along the inward curved surface inside the enclosed chamber.

According to a further aspect of the present invention, at least one dampening weight of the present may preferably include a hollow, inner cavity. According to further aspects of the present invention, the dampening weight preferably may further include a granular material located within the inner cavity.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and to improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTION OF THE DRAWINGS

Figure 9:
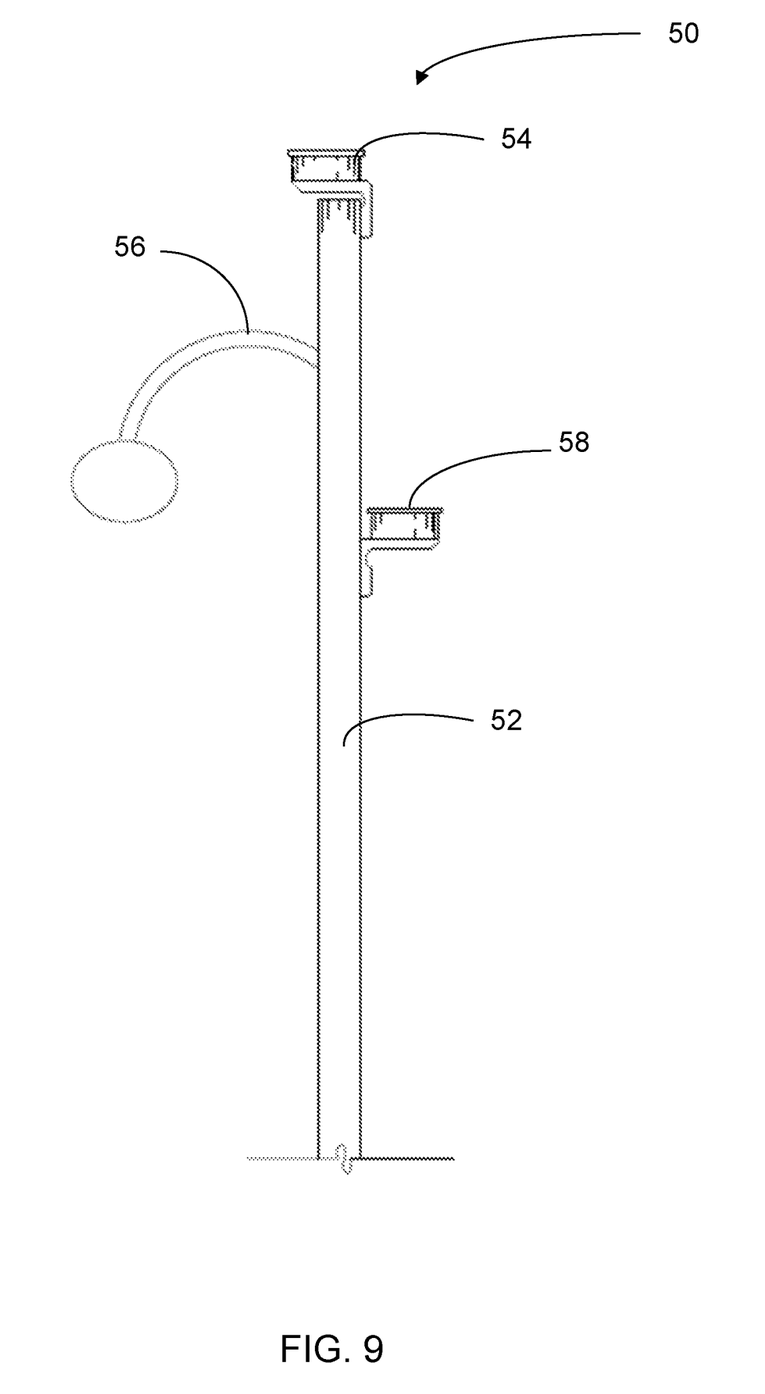
FIG. 9 is a cross-sectional view of a further alternative preferred embodiment.

FIG. 9 is a side view of an alternative preferred embodiment of the present invention including multiple dampening devices.

Reference is now made in detail to the exemplary embodiments of the invention, examples of which are illustrated in the accompanying drawings. Wherever possible, the same reference numbers will be used throughout the drawings to refer to the same or like parts. The description, embodiments and figures are not to be taken as limiting the scope of the claims. It should also be understood that throughout this disclosure, unless logically required to be otherwise, where a process or method is shown or described, the steps of the method may be performed in any order, repetitively, iteratively or simultaneously. As used throughout this application, the word "may" is used in a permissive sense i.e., meaning "having the potential to'), rather than the mandatory sense (i.e. meaning "must").

Additionally, any examples or illustrations given herein are not to be regarded in any way as restrictions on, limits to, or express definitions of, any term or terms with which they are utilized. Instead, these examples or illustrations are to be regarded as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

Further, various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

Figure 1A:
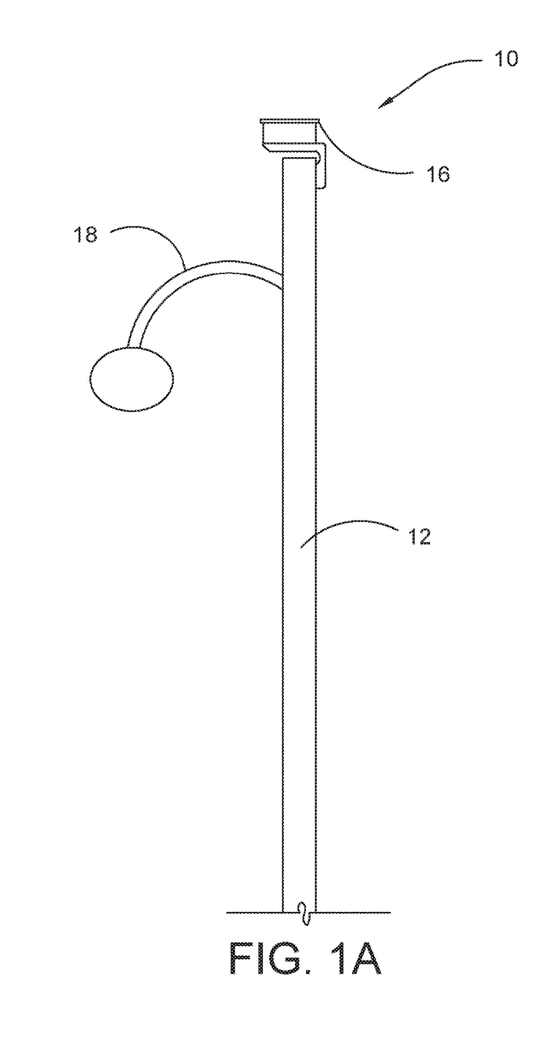
FIG. 1A is a side view of an exemplary light pole fitted with a dampening device in accordance with a first aspect of the present invention.
Figure 1B:
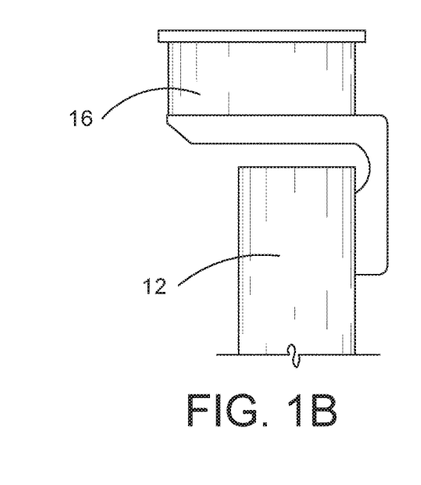
FIG. 1B is an enlarged view of the dampening device shown in FIG. 1A.

FIG. 1A illustrates a perspective view 10 of an exemplary light pole 12 fitted with a dampening device 16 in accordance with a first aspect of the present invention. FIG. 1B is an enlarged view of the dampening device 16 shown in FIG. 1A. As shown, the exemplary dampening device 16 may preferably be position at or near the top end of a light pole 12. The mounting of the dampening device 16 may be with any form of connector or clamp of conventional construction. As should be understood, the light pole 12 is purely exemplary and the present invention may be attached to any structure to achieve the advantages of the present invention.

As further shown in FIG. 1A, the light pole 12 may preferably be further secured to a base 14 and may preferably support a light 18. Alternatively, the structure represented by the light pole 12 may further include a cantilevered arm or the like and may support various objects such as signs, traffic lights, over-head wires and the like. According to a further alternative preferred embodiment, the exemplary dampening device 16 of the present invention may alternatively be positioned in the mid and/or lower sections of the light pole 12 as discussed further below.

Figure 2:
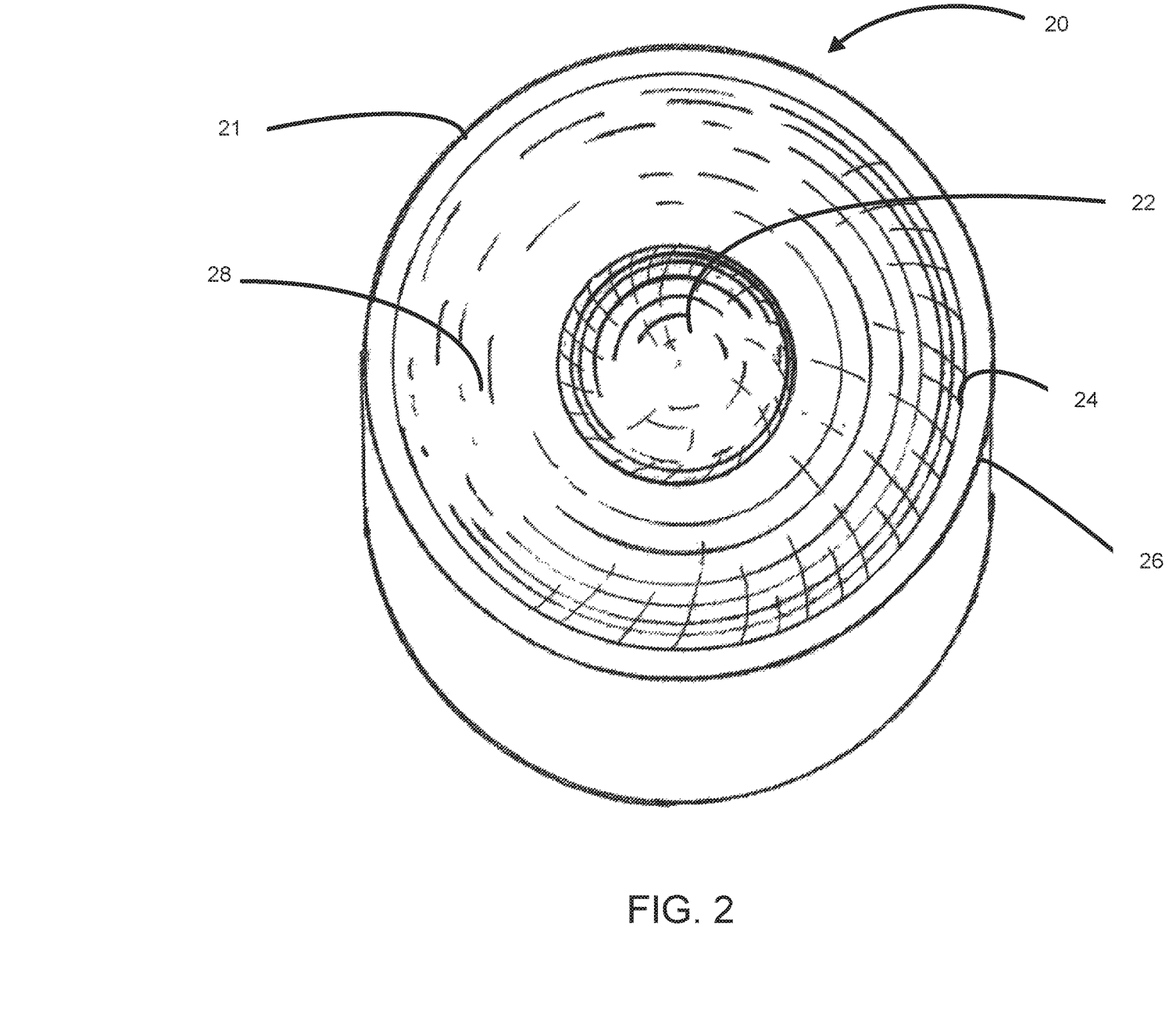
FIG. 2 is a top perspective view of the dampening device shown in FIG. 1A with an exemplary dampening sphere in accordance with a first aspect of the present invention.

With reference now to FIG. 2, a top perspective view 20 of the interior of the dampening device 16 shown in FIG. 1A is provided. As shown, the exemplary dampening device 16 may preferably include an enclosed lower portion 21 which includes a center floor 28 surrounded by an interior wall 24 and enclosed by an outer wall 26. According to a preferred embodiment, the center floor 28 may preferably be concave with a constant radius. According to a further preferred embodiment, the center floor 28 may preferably be of a varying radius of curvature to achieve effective realizations of nonlinear energy sinks. Alternatively, the center floor 28 may be a flat surface (zero curve) bounded by the outer walls 26. According to a further preferred embodiment, the interior wall 24 may preferably be ringed with a deformable, impact absorbing material such as plastic, stuffed fabric or other padding type materials.

As further shown in FIG. 2, the lower portion 21 of the dampening device 16 may preferably support and enclose one or more dampening spheres 22. According to a preferred embodiment, the dampening spheres 22 of the present invention may preferably be hollow spheres which are selectively filled with energy absorbing materials as discussed with respect to FIG. 3 below.

Figure 3:
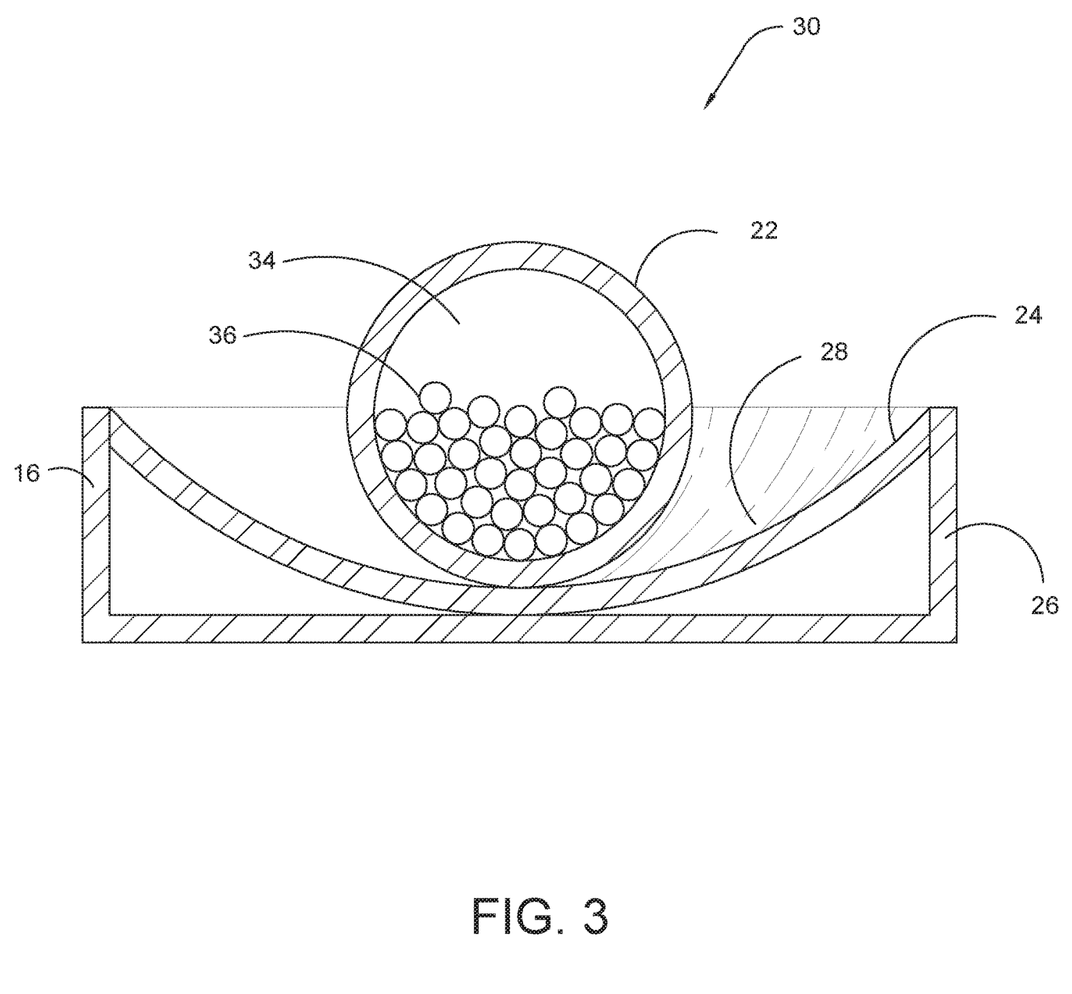
FIG. 3 is a cross-sectional view of the dampening device and dampening sphere shown in FIG. 2.

With reference now to FIG. 3, a cross-sectional view 30 of an exemplary dampening device 16 and dampening sphere 22 as shown in FIGS. 1A, 19 and 2 is provided. As shown in FIG. 3, the dampening device 16 includes an inner surface 24 which preferably includes and forms a center floor 28. Further, the dampening device 16 preferably further includes an outer shell 26 which preferably encloses the inner surface 24 and at least one dampening sphere 22. According to preferred embodiments, the inner surface 24 and the center floor 28 may substantially overlap and act as a single, curved surface as shown in FIG. 3. Alternatively, the inner surface 24 may include a lip, edge, border or other boundary which defines a separate center floor 28 which is apart from other sections or walls of the inner surface 24. According to a further preferred embodiment, the dampening sphere 22 may preferably include a hollow center region 34 which may be filled with energy absorbing particles and/or liquid 36. According to a further preferred embodiment, the energy absorbing particles 36 may preferably be sand, aluminum, stainless-steel shot or the like. Alternatively, the energy absorbing particles 36 may be made of any material without limitation. For example, the particles 36 may be formed of materials such as: plastic, metal, rubber, stone, silicone, mercury and/or other materials which provide mass, and which can transfer kinetic energy.

According to an alternative preferred embodiment, the walls of the dampening device 16 may be utilized to abruptly stop the dampening sphere(s) 22 resulting in an impact load and dissipation of energy as the moving particles impact the inside wall of the moving sphere 22. During such impacts, the kinetic energy of the moving particles is dissipated as the particles impact and come to rest. Preferably, the sphere(s) 22 acts as a mechanism to convert the energy of wind excitation and/or pole vibration into kinetic energy of the energy absorbing particles, while the sudden impact with the dampening device wall dissipates that energy. According to a further preferred embodiment, the interior wall(s) of the dampening device 16 can be coated with a material to absorb further energy and/or quite the sound of the impact.

According to alternative preferred embodiments, the energy absorbing particles 36 may preferably be any size and may be formed from a variety of materials including stainless steel, sand, lead shot, aluminum and the like. Preferably, the materials may be selected based on their specific densities and their particular ability to capture and translate vibrational energy into kinetic energy within the dampening sphere 22. According to a preferred embodiment, the particles 36 may preferably be of a sufficient density to allow for a greater absorption of higher energy vibrations.

According to a further preferred embodiment, the particles 36 of the present invention may preferably be sealed and protected against corrosion. Accordingly, the particles 36 may preferably be heated to a sufficient temperature prior to sealing to remove any humidity or moisture. According to a further preferred embodiment, 20-90% of the interior volume of the dampening sphere 22 may preferably be filled with particles 36. According to a further preferred embodiment, 70-90% of the interior volume of the dampening sphere 22 may preferably be filled with particles 36. According to a further preferred embodiment, 50-60% of the interior volume of the dampening sphere 22 may preferably be filled with particles 36. While these ranges are suggested, they are intended to be exemplary and many other ranges may be used to address different vibrational environments. According to further alternative embodiments, the interior volume of the dampening sphere 22 may further be filled with a variety of liquids in addition to the particles 36. According to preferred embodiments, a liquid may be added in sufficient amounts to make a slurry mixture within the dampening sphere. According to further preferred embodiments, the liquid may include glycol antifreeze or the like to prevent freezing of the enclosed liquid(s).

Figure 8:
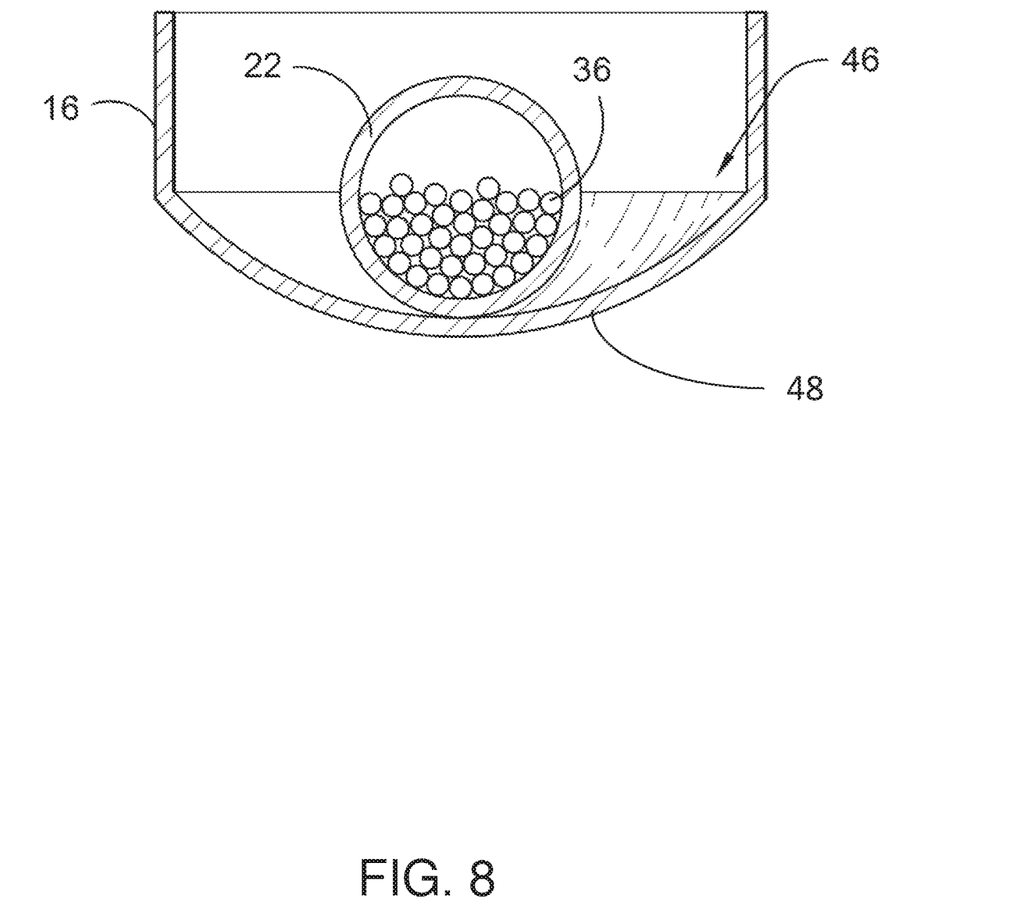
FIG. 8 is a cross-section view of an alternative embodiment of the dampening device.

According to an alternative preferred embodiment, the dampening sphere of the present invention may preferably include a first sized particle for use and attachment to the upper portions of the light pole 12 and a second sized particle for use and attachment to the mid or lower portion of the light pole 12. According to a further preferred embodiment, the first sized particles for use and attachment to the upper portions of the light pole 12 may have a lower density than the second sized particles. According to a further preferred embodiment, the first sized particles may preferably be selected and formed to most effectively absorb vibrational energy from wind vibration and/or the upper swaying of the pole 12. According to a further preferred embodiment, the second sized particles may preferably be selected and formed to most effectively absorb vibrational energy from road vehicles and the like. The profile of center floor 28, the material and physical properties of particles 36, the size and interior volume of sphere 22 may all be adjusted to provide specific levels of mass, stiffness and damping for effective vibration mitigation of various applications. As shown in FIG. 8, the dampening device 16 of the present invention may alternatively include a sloped or bowled lower surface 48 which acts as both the inner surface floor and the outer shell of the dampening device.

With reference now to FIG. 9, an illustration of the alternative preferred embodiment discussed above is provided. As shown, the alternative preferred embodiment 50 may preferably include a first dampening device 54 including a first sized particle 60 for use and attachment to the upper portions 64 of the light pole 52. Further, a second dampening device 58 is shown which preferably includes a second sized particle 62 for use and attachment to the mid or lower portion 64 of the light pole 52. As discussed above, the first sized particles 60 for use and attachment to the upper portions of the light pole 52 may preferably have a lower density than the second sized particles 62.

Figure 4:
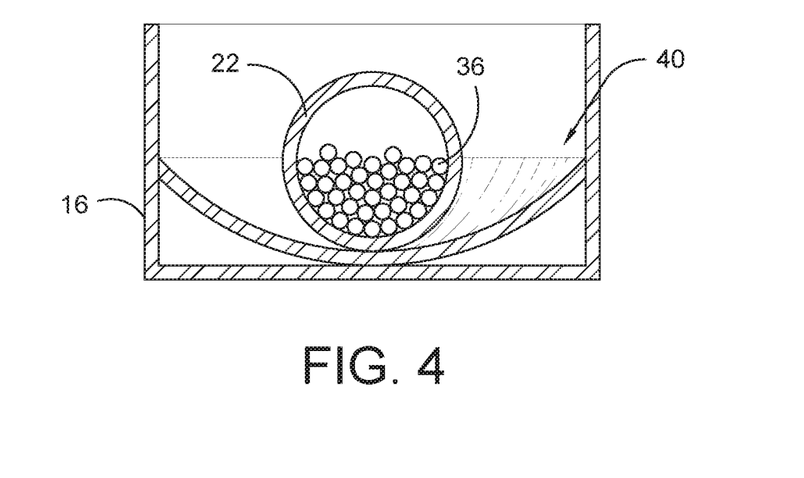
FIG. 4 is a cross-sectional view of a dampening sphere in a starting zero-energy state

With reference now to FIGS. 4-7, an example of the operation of an exemplary dampening sphere 22 of the present invention shall now be discussed. In FIG. 4, a cross-sectional view of a dampening sphere 22 is shown where the dampening sphere 22 is in a starting or zero-energy state 40 where the particles 36 are at rest and the dampening sphere 22 is not subject to vibrational forces.

Figure 5:
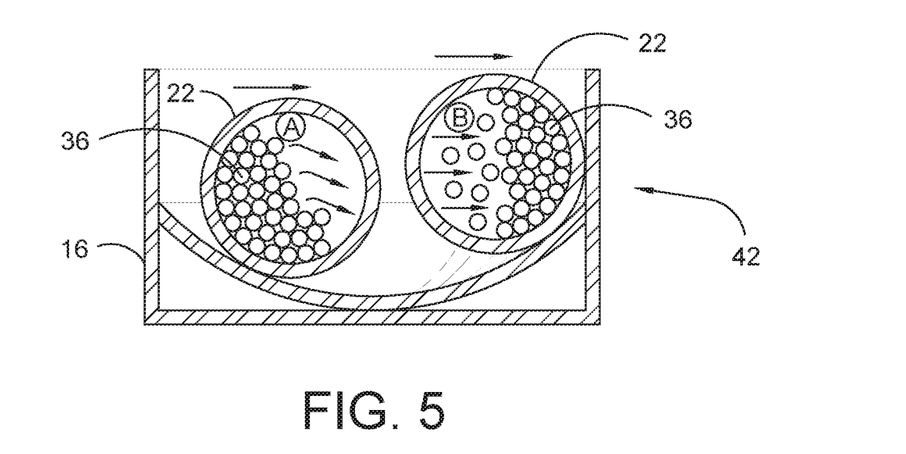
FIG. 5 is a cross-sectional view of the dampening sphere shown in FIG. 4 in a first energy release state.

FIG. 5 shows a cross-sectional view of the dampening sphere 22 in a first energy release state 42. In this state, in response to vibrational forces, the dampening sphere 22 has been made to roll from a first position A to a second position B within the dampening device 16. As shown, the particles 36 at position A have been raised to store potential energy which is then released in a tumbling or leveling action as the sphere 22 moves to position B. As further shown, in position B, the sphere 22 may impact the wall of the dampening device 16 and further transfer kinetic energy from the impact into sphere 22.

Figure 6:
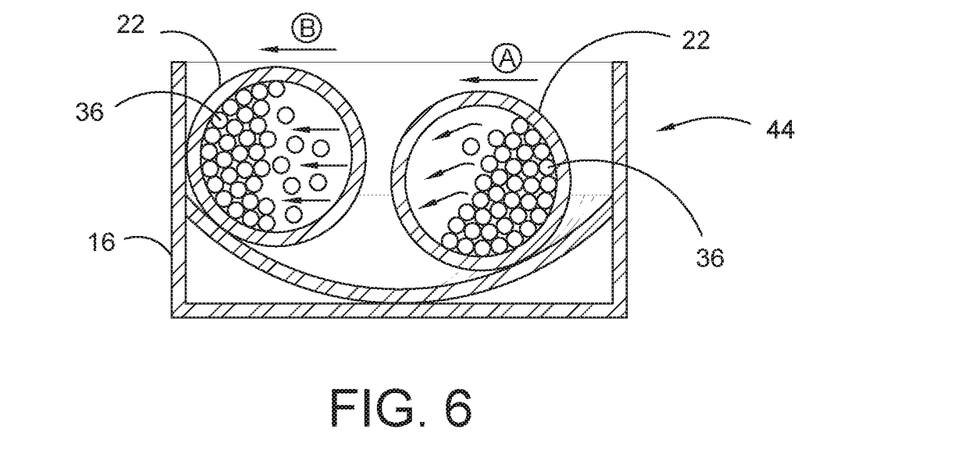
FIG. 6 is a cross-sectional view of the dampening sphere shown in FIG. 5 in a second energy release state.

FIG. 6 shows a cross-sectional view of the dampening sphere 22 in a second energy release state 44. In this state 44, in response to the movement of sphere 22 to a higher point on the center floor 28 (and/or a wall impact), the particles 36 at position A in FIG. 6 will preferably tumble and seek to level thereby releasing kinetic energy as the sphere moves to position B. Subsequently, at position B the particles 36 will preferably again store potential energy which is once again released in a tumbling or leveling action as the system moves back to energy release state 42 as discussed with respect to FIG. 5 above. According to preferred embodiments, with each change between the first and second energy release states, the kinetic energy of system is preferably continually reduced/dissipated due to the friction of the particles 36 and the retarding effects of gravitation.

Figure 7:
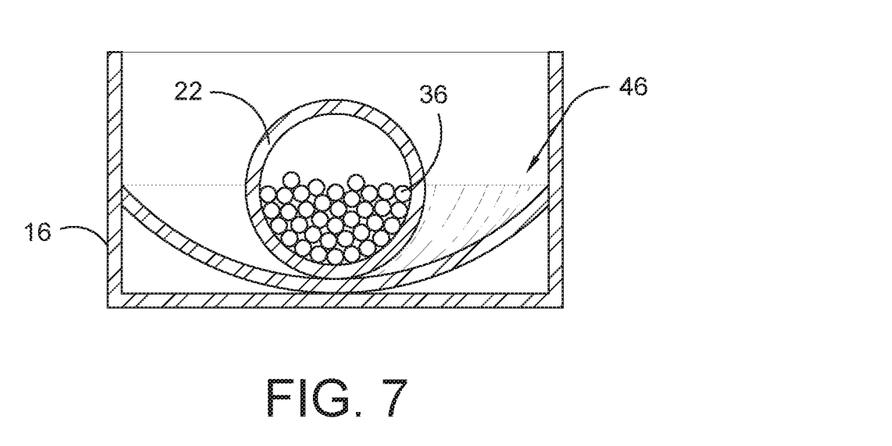
FIG. 7 is a cross-sectional view of a dampening sphere in a final zero-energy state.

In operation, the translation of the dampening sphere 22 from the first energy state 42 to the second energy state 44 may occur any number of times as energy is slowly dissipated from the dampening device 16. As shown in FIG. 7, once all the energy has been dissipated, the dampening sphere 22 preferably returns to a final zero-energy state 46.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

What is claimed is:

1. An apparatus for providing vibrational dampening for a vertical structure, the apparatus comprising:
   a first enclosed housing; wherein the first enclosed housing is comprised of a bottom wall, a side wall and a top wall;
   a first concave flooring surface, wherein the first concave flooring surface is enclosed within the first enclosed housing; and
   a first dampening weight, wherein the first dampening weight is located within the first enclosed housing; further wherein the first dampening weight is comprised of a spherical mass which is configured to freely roll on the first concave flooring surface;
   wherein the first dampening weight is comprised of a first inner cavity; further wherein the first dampening weight is further comprised of a plurality of first dampening particles located within the first inner cavity;
   a second enclosed housing; wherein the second enclosed housing is comprised of a bottom wall, a side wall and a top wall;

a second concave flooring surface, wherein the second concave flooring surface is enclosed within the second enclosed housing; and a second dampening weight, wherein the second dampening weight is located within the second enclosed housing; further wherein the second dampening weight is comprised of a second spherical mass which is configured to freely roll on the second concave flooring surface;

wherein the second dampening weight is comprised of a second inner cavity; further wherein the second dampening weight is further comprised of a plurality of second dampening particles located within the second inner cavity;

wherein the first enclosed housing is attached to the vertical structure at a first point; wherein the second enclosed housing is attached to the vertical structure at a second point; wherein the first and second points of the vertical structure are separate from each other;

wherein the first dampening particles have a first density;

wherein the second dampening particles have a second density;

wherein the first density is lower than the second density.

2. The apparatus of claim 1, wherein the density of the first dampening particles preferentially absorbs vibrational energy from wind vibration and the upper swaying of the vertical structure.

3. The apparatus of claim 2, wherein the density of the second dampening particles preferentially absorbs vibrational energy from road vehicles.

4. The apparatus of claim 3, wherein 20-90% of the interior volume of the first dampening weight is filled with first dampening particles.

5. The apparatus of claim 3, wherein 70-90% of the interior volume of the first dampening weight is filled with first dampening particles.

6. The apparatus of claim 3, wherein 50-60% of the interior volume of the first dampening weight is filled with first dampening particles.

7. An apparatus for damping vibration energy in a horizontal plane, the apparatus comprising:

a first enclosed housing, wherein the first enclosed housing is comprised of a bottom wall, a side wall and a top wall;

a first concave flooring surface, wherein the first concave flooring surface is enclosed within the first enclosed housing; and a first dampening weight, wherein the first dampening weight is located within the first enclosed housing; wherein the first dampening weight is comprised of a spherical mass which is configured to freely roll on the first concave flooring surface;

wherein the first dampening weight is comprised of a first inner cavity; further wherein the first dampening weight is further comprised of a plurality of first dampening particles located within the first inner cavity;

wherein the inner cavity further comprises a first amount of a liquid.

8. The apparatus of claim 7, wherein the first amount of the liquid is sufficient to make a slurry mixture with the first dampening particles within the first dampening weight.

9. The apparatus of claim 8, wherein the first amount of liquid comprises antifreeze.

10. The apparatus of claim 8, wherein 20-90% of the interior volume of the first dampening weight is filled with first dampening particles.

11. The apparatus of claim 9, wherein 70-90% of the interior volume of the first dampening weight is filled with first dampening particles.

12. The apparatus of claim 10, wherein 50-60% of the interior volume of the first dampening weight is filled with first dampening particles.

* * * * *